(12) United States Patent
Kovvali et al.

(10) Patent No.: US 11,876,687 B2
(45) Date of Patent: Jan. 16, 2024

(54) TELECOMMUNICATION CALL EMULATION

(71) Applicant: Ribbon Communications Operating Company, Inc., Westford, MA (US)

(72) Inventors: Surya Kumar Kovvali, Plano, TX (US); Cyril D P Raymond, Bengaluru (IN)

(73) Assignee: RIBBON COMMUNICATIONS, Plano, TX (US)

( * ) Notice: Subject to any disclaimer, the term of this patent is extended or adjusted under 35 U.S.C. 154(b) by 43 days.

(21) Appl. No.: 16/962,826

(22) PCT Filed: Jul. 12, 2019

(86) PCT No.: PCT/US2019/041553
§ 371 (c)(1),
(2) Date: Jul. 16, 2020

(87) PCT Pub. No.: WO2020/014579
PCT Pub. Date: Jan. 16, 2020

(65) Prior Publication Data
US 2021/0385331 A1    Dec. 9, 2021

Related U.S. Application Data (60) Provisional application No. 62/763,969, filed on Jul. 12, 2018.

(51) Int. Cl.
*H04M 3/00* (2006.01)
*H04L 41/16* (2022.01)
(Continued)

(52) U.S. Cl.
CPC ............ *H04L 41/16* (2013.01); *G06F 16/907* (2019.01); *G06F 18/2148* (2023.01);
(Continued)

(58) Field of Classification Search
CPC .............. H04M 3/5175; H04M 3/5183; H04L 65/1006; H04L 65/608; H04L 65/1073;
(Continued)

(56) References Cited

U.S. PATENT DOCUMENTS 6,363,056 B1 * 3/2002 Beigi ..................... H04L 43/10
709/224
6,731,730 B1    5/2004 Zolotov
(Continued)

FOREIGN PATENT DOCUMENTS

EP    3197097 A1    7/2017
EP    3342146 A1    7/2018
(Continued)

OTHER PUBLICATIONS

International Searching Authority, PCT Notification of Transmittal of the International Search Report and the Written Opinion of the International Searching Authority, or the Declaration dated Oct. 7, 2019, for International Appl. No. PCT/US2019/041553, 8 pages, Alexandria, VA.
(Continued)

*Primary Examiner* — Rasha S Al Aubaidi
(74) *Attorney, Agent, or Firm* — HAYNES AND BOONE, LLP (57) ABSTRACT

A method includes, receiving protocol event data from a plurality of probes within the telecommunication system, associating the protocol event data into a call, wherein the protocol event data comprises processes in a plurality of protocols, mapping the protocol event data into a per-call finite state machine, wherein the finite state machine represents possible call states in multiple protocols between call setup and termination, wherein the mapping is performed at least in part within a duration of the call, and after termination of the call, creating a call data record that includes (Continued)

information from the per-call finite state machine and Key Performance Indicator (KPI) information of the call.

20 Claims, 6 Drawing Sheets (51) Int. Cl.
| | |
|---|---|
| *G06F 16/907* | (2019.01) |
| *G06N 3/08* | (2023.01) |
| *G06Q 10/0639* | (2023.01) |
| *G06N 5/04* | (2023.01) |
| *H04L 41/5009* | (2022.01) |
| *H04L 43/0817* | (2022.01) |
| *H04L 43/0823* | (2022.01) |
| *H04W 24/02* | (2009.01) |
| *H04W 24/04* | (2009.01) |
| *H04W 24/08* | (2009.01) |
| *H04W 24/10* | (2009.01) |
| *H04L 65/1073* | (2022.01) |
| *H04M 3/51* | (2006.01) |
| *H04L 41/0631* | (2022.01) |
| *H04L 65/65* | (2022.01) |
| *H04L 65/1104* | (2022.01) |
| *G06F 18/23* | (2023.01) |
| *G06F 18/214* | (2023.01) |
| *G06F 18/2415* | (2023.01) |

(52) U.S. Cl.
CPC ........ *G06F 18/23* (2023.01); *G06F 18/24155* (2023.01); *G06N 3/08* (2013.01); *G06N 5/04* (2013.01); *G06Q 10/06393* (2013.01); *H04L 41/0631* (2013.01); *H04L 41/5009* (2013.01); *H04L 43/0817* (2013.01); *H04L 43/0823* (2013.01); *H04L 65/1073* (2013.01); *H04L 65/1104* (2022.05); *H04L 65/65* (2022.05); *H04M 3/5175* (2013.01); *H04W 24/02* (2013.01); *H04W 24/04* (2013.01); *H04W 24/08* (2013.01); *H04W 24/10* (2013.01)

(58) Field of Classification Search
CPC .. H04L 29/06; H04L 65/1053; H04L 65/1096
See application file for complete search history.

(56) References Cited

U.S. PATENT DOCUMENTS

| | | |
|---|---|---|
| 8,565,076 B2 | 10/2013 | Kovvali et al. |
| 8,732,170 B2 | 5/2014 | Kalavade |
| 8,755,297 B2 | 6/2014 | Kalavade |
| 8,908,507 B2 | 12/2014 | Kovvali et al. |
| 9,204,329 B2 | 12/2015 | Boyle et al. |
| 9,204,474 B2 | 12/2015 | Kovvali et al. |
| 9,414,248 B2 | 8/2016 | Kovvali et al. |
| 2006/0114832 A1 | 6/2006 | Hamilton et al. |
| 2008/0097807 A1 | 4/2008 | Chang et al. |
| 2011/0194556 A1 | 8/2011 | Butler et al. |
| 2012/0230214 A1 | 9/2012 | Kozisek et al. |
| 2014/0359462 A1 | 12/2014 | Khalil et al. |

FOREIGN PATENT DOCUMENTS

| | | |
|---|---|---|
| EP | 3342146 B1 | 3/2021 |
| WO | WO 2017/025773 A1 | 2/2017 |
| WO | WO 2017/037598 A1 | 3/2017 |

OTHER PUBLICATIONS

European Patent Office, Communication—European Search Report dated Mar. 11, 2022 for Application No. 19834784.1, 8 pages, Munich Germany.
European Patent Office, Communication—European Search Report dated Mar. 9, 2022 for Application No. 19833131.6, 8 pages, Munich Germany.
European Patent Office, Communication—European Search Report dated Mar. 11, 2022 for Application No. 19834934.2, 8 pages, Munich Germany.
European Patent Office, Communication—European Search Report dated Mar. 1, 2022 for Application No. 19834933.4, 9 pages, Munich Germany.

\* cited by examiner

602 receiving protocol event data from a plurality of probes within the telecommunication system

604 associating the protocol event data into a call, wherein the protocol event data comprises processes in a plurality of protocols

606 mapping the protocol event data into a per-call finite state machine, wherein the mapping is performed at least in part within a duration of the call and in real time

608 after termination of the call, creating a call data record that includes information from the per-call finite state machine and Key Performance Indicator (KPI) information of the call

*FIG. 6*

TELECOMMUNICATION CALL EMULATION

PRIORITY INFORMATION

This application is a U.S. National Stage patent application of International Patent Application No. PCT/US2019/041553 filed on Jul. 12, 2019, which claims the benefit of U.S. Provisional Patent No. 62/763,969 filed Jul. 12, 2018 and entitled "A Method For Automatically Classifying Network Performance and Degradation and Corrective Action Given Network Data Events and Key Performance Indicators," the disclosures of which are hereby incorporated by reference in their entirety.

BACKGROUND

Network service providers such as mobile operators, cable operators or Internet service providers spend a disproportionate amount of time and money operating the network as compared to the original cost of network roll-out. This stems from the complex relationship of layered, multi-vendor network elements, geographically dispersed communication, the mesh of interconnectivity to handle capacity and failures, as well as the historical nature of the services which require backwards compatibility with the end-users (e.g. service subscribers). A component in maintaining these networks is the software that delivers core operational functions such as performance monitoring and fault management, ultimately contributing to the analysis and resolution.

Traditional systems that implement this core function include an over-arching Operational Support System (OSS), one or more Network Management System (NMSs), and many Element Management Systems (EMSs). This hierarchy allows each subsystem to attempt to correlate cause within its scope. That is, the EMS system may realize what is causing Key Performance Indicator (KPI) issues with underlying network elements (e.g., router, switch, application gateway). The NMS may correlate across multiple network elements associated with a particular vendor product suite, and the OSS may look to diagnosis failures across multiple vendors with the details from underlying systems.

As the network size, number of subscribers, types of user devices, and services increase, various types of KPIs, and their associations and densities relative to specific locations, network elements, device types etc., may be over-whelming to service personnel and take significant time to navigate through many UI screens.

BRIEF DESCRIPTION OF THE DRAWINGS

The present disclosure is best understood from the following detailed description when read with the accompanying figures.

SUMMARY

[AFTER FINAL CLAIMS]

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In order to run various analytical functions on large amounts of data it may be desirable to classify certain telecommunication events into various KPI categories. For example, one KPI may be a failed registration. Another KPI may be a dropped call. However, classifying various telecommunication events (such as calls) may be difficult because a typical call involves multiple telecommunication protocols and multiple pieces of hardware. Moreover, data from just one protocol may not be sufficient to identify the event with as much specificity as desired. For example, the SIP protocol may return a cause code of 480, indicating that the callee is currently unavailable, whereas the real issue may be a Radio Access Network (RAN) malfunction preventing connection. However, SIP information alone may be insufficient to determine exactly why the callee is currently unavailable.

Various embodiments provide systems, methods, and computer program products to identify a state of a given call during the duration of the call, across multiple protocols, and from a user device to a Radio Access Network (RAN) to a Core Network (CN). The state of the call is identified in near real time using replicated packets from network probes. In the case of a negative KPI (e.g., failed call), the call state is used to construct an event object, which provides an overview of the call, including indicating its KPI, cause codes, protocols, and the like. The event object may be compared against other failures to diagnose a problem.

Call emulation, in some embodiments, includes constructing a finite state machine to represent the state of the call based on the event data from the protocol data received from probes or other network elements. The event data includes multiple protocol events (for example from SIP, RTP, S1U, S11, S1AP, Sv for VoLTE processes) that correspond to protocol transactions. An example technique includes constructing a per-call state machine that reflects the state of the call and summarizing the overall KPIs per call.

Example techniques construct a finite state machine to represent the state of the call based on the event data from protocol data received from probes or other network elements. Such protocol data includes, SIP, RTP, S11, S1AP, Sv, RX, MW, and the like. In other words, various embodiments construct the finite state machine across multiple phases and multiple protocols. Each Voice over LTE (VoLTE), or Video Over LTE (ViLTE) call includes 6 phases: (1) User Plane Tunnel Creation using S1AP/S1MME signaling protocols to carry session initiation protocol (SIP) packets, (2) Call Establishment phase, (3) User Plane Tunnel creation via S1AP/S11MME signaling protocol to carry real time protocol (RTP) and RTP control protocol (RTCP) packets, (4) Data Exchange Phase, (5) Call Termination, (6) User Plane tunnel deletion phase via S1AP/S11MME, etc. If the user moves from one eNodeB to another or from LTE to UMTS networks, there may be additional protocol exchanges associated with the call as well, and the finite state machine may include states encompassing these protocol exchanges as well.

Call KPIs identify success, failure, and quality of each phase. Since a call may involve multiple protocol exchanges that include hand-overs such as with Single Radio Voice Call Continuity (SRVCC), tracking a call by finite state machine may facilitate grouping each of the events associated with a call to a single call entity for determining the overall quality and user experience of the call. With call emulation, the KPIs of each call-phase are labelled based on protocol event data over a large time period, and the labels are applied to the events corresponding to that call. The labelled events may then be used as training dataset to machine learning algorithms such as Random Forest, Decision Trees etc. The model is then used to assign KPIs to events of subsequent calls without stitching the events of those calls, thus reducing the processing times, and near real-time KPI determination. In some embodiments, an event object that represents the call and its KPIs from the different call phases is compared against known faults to diagnose the problem with the particular call.

Since a call-phase may have multiple events, for example multiple INVITES or multiple data events etc., there may be multiple KPIs for the same phase of a call; the KPIs may then be prioritized and aggregated (for example Mean Opinion Score, or MOS) for a unique KPI for that phase of the call. The data events of the call that use RTP protocol may have many events depending on the duration of the call, frequency of data collection, codec changes, or mobility events (e.g., user moved from one sector or eNodeB to another). Thus, the duration of each event may be different. Characterizing voice quality as MOS score based on jitter, packet drop, latency etc., is used in some embodiments. Some examples aggregate MOS scores for different time intervals to an aggregate score per call using time weighted averaging as:

Aggregate MOS score for call=sum (MOS score for event duration*event duration)/Total call duration). Furthermore, the embodiments described herein may combine such scores of different durations due to mobility, observation intervals etc., to a composite score for characterizing the call.

To identify a state of a given call, various methods include correlating the uplink and downlink flows of a VoLTE or ViLTE procedure with unidirectional tunnel-id. For instance, the present disclosure includes learning and identifying two unidirectional tunnels (such as GTP-U tunnels in UMTS and LTE Networks) corresponding to a user equipment (UE) using a device placed in a Radio Access Network, where the device acts as a transparent proxy intercepting user plane and control plane protocols on the S1 interface. The S1 interface is the logical interface between eNodeB and core network. This interface includes the control plane (S1-C) between the eNodeB and the MME (Mobility Management Entity), and the user plane (S1-U) between the eNodeB and the SGW (Serving Gateway). Various embodiments extend this concept to additional protocols, for example for SIP, RTP, RTCP protocols that are carried in the S1U user plane tunnels.

The GTP-U tunnels on the S1 interface in the LTE architecture and the IUPS interface in UMTS architecture are per UE and are unidirectional. Thus, traffic received from the eNodeB contains the S/PGW (Serving Gateway/PDN Gateway) Tunnel ID, user source/destination IP addresses, and source/destination transport addresses. Traffic received from the S/PGW contains the eNodeB Tunnel ID, user source/destination IP addresses, and source/destination transport addresses. The two unidirectional tunnels belonging to a specific UE are then associated with each other for delivering any locally cached content or for delivering traffic received from an offload interface in a transit network device placed in RAN. Various embodiments extend these concepts to the per-call level, since a call may have multiple user plane tunnels with different QCI Classes, for example, QCI=5 to carry SIP traffic and QCI=1 to carry RTP data packets. If the call is a multi-party call, that would include such tunnels for each user in the call.

In one example, to establish a user plane GTP-U tunnel for data transfer, the Mobility Management Entity (MME) sends "Initial Context Setup Request" message to the eNodeB. This message contains the following fields or parameters: i. MME-UE-S1AP-ID, ii. eNodeB-UE-S1AP-ID, iii. Transport Layer Address (TLA) & GTP-TEID (Tunnel Endpoint Identifier) for uplink traffic, iv. Other information elements, such as E-RAB ID, E-RAB QOS parameters, and v. encrypted NAS PDU that contains bearer IP address.

Continuing with the example, the eNodeB receives the "Initial Context Setup Request" and returns "Initial Context Setup Response" message that contains: i. MME UE S1AP ID and eNodeB UE S1AP ID, ii. E-RAB ID, iii. TLA & GTP-TEID for sending downstream traffic of this UE to this eNodeB, and iv. other information elements.

The MME-UE-S1AP-ID, eNodeB-UE-S1AP-ID, and RAB-IDs in the above messages identify that they are for the same UE, and the same E-RAB. The TLA and GTP-TEIDs are unidirectional in the sense that one TLA and GTP-TEID pair corresponds to the tunnel for downstream traffic to the eNodeB for the specific UE, and the other {TLA,GTP-TEID} pair defines the tunnel that the eNodeB should use for sending upstream traffic from the UE.

Thus, the analytics platform 101 (FIG. 1) snoops the S1-AP messages and associates the "Initial Context Setup Request" message and the "Initial Context Setup Response" message. Since the same per UE S1AP IDs, and RAB IDs are used, the analytics platform 101 (FIG. 1) can establish a relationship between the two unidirectional {TLA, GTP-TEID} pairs. In other words, the analytics platform 101 may parse packets from the probes to identify common information at different protocols and different protocol levels. Common information may then indicate that different protocol events belong to a same call. Accordingly, the system may correlate those different protocol events have in common information and group them into a single call.

Such techniques are described in more detail in U.S. Pat. Nos. 8,565,076 and 9,204,474, the contents of which are hereby incorporated by reference in their entirety. Of course, these examples are not limiting, as various embodiments may apply to any telecommunication transaction. For instance, the scope of embodiments is not limited to LTE, as these principles apply just as well to 3G and 5G systems.

Figure 1:
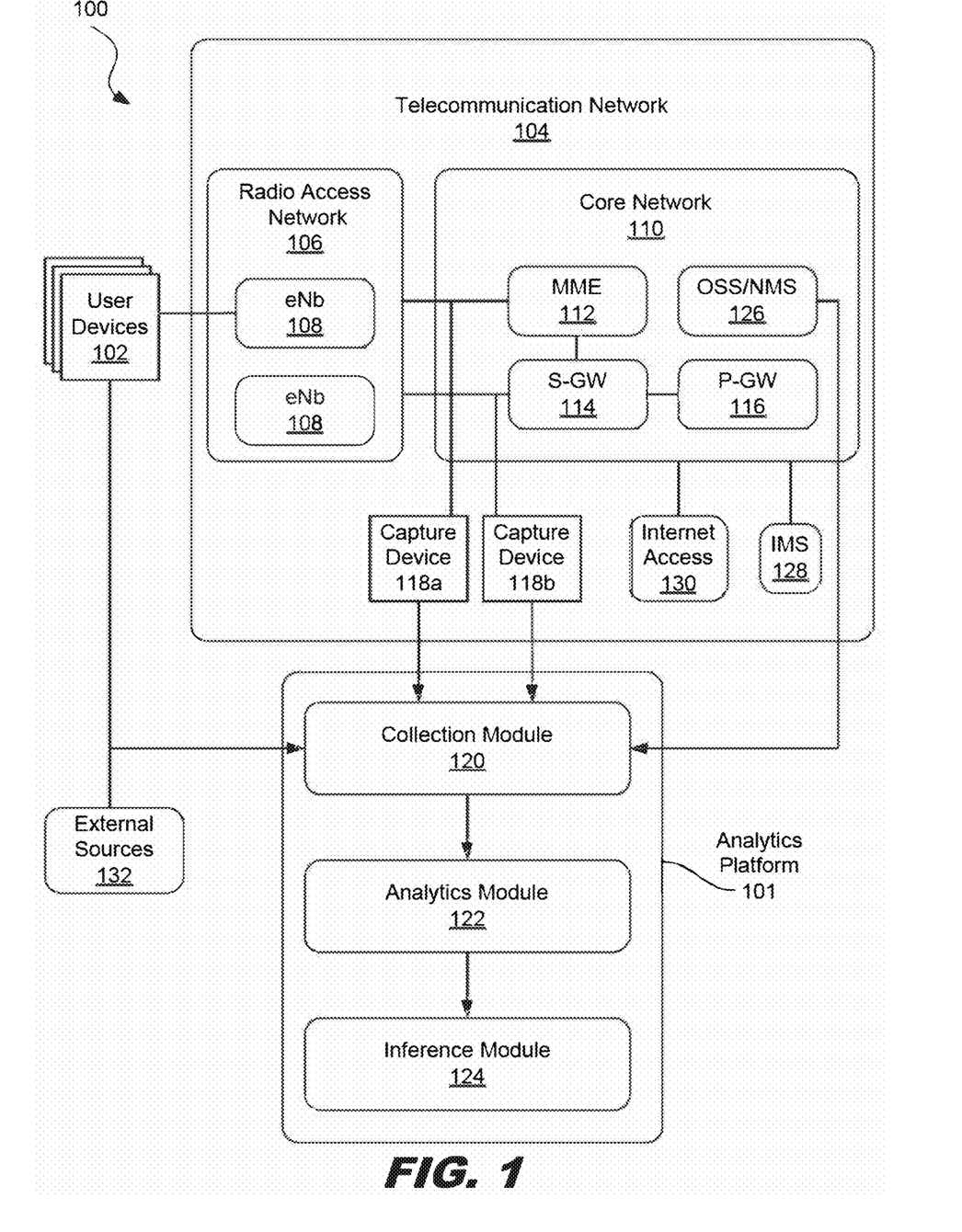
FIG. 1 is a diagram showing an illustrative environment 100 in which classification of telecommunication event objects may be performed, according to one example of principles described herein.

Various embodiments also include the analytics platform 101 summarizing information from RTP data records that include downlink bytes, uplink bytes, interpacket gaps, jitter, delay, UP Link timeouts, Downlink timeouts. Various embodiments combine the RTP data records with SIP call records such as "DATA" events by correlation using international mobile subscriber identity (IMSI), User IP Addresses, SGW, eNodeB IP Addresses, TCP/UDP port numbers, event timestamps, and the like. Similarly, event data from other protocol events, such as S11 tunnel creation/deletion events, Sv (SRVCC) VOLTE to CS Handover and X2 (inter eNodeB) handover are correlated using common attributes such as IMSI, Mobile Subscriber ISDN (MSISDN), From/To Identifiers, event time stamp, and the like.

Additionally, the analytics platform 101 correlates event data from other protocol events, such as S11 tunnel creation/deletion events, Sv (SRVCC) VoLTE to CS handover are correlated using common attributes such as IMSI, MSISDN, From/To Identifiers, event time stamp etc. The cause code for the event, and its effect on the VoLTE call (SIP or RTP Flows) of user calls is identified by the analytics platform 101. For example, tunnel deletion event due to "inactivity" or "radio connection with UE lost" may cause timeout in RTP or SIP transaction. Based on event timestamps of SIP and RTP, the call duration is computed by the analytics platform 101. For example, the difference between timestamps of BYE and INVITE with same call/D, timestamp, or the difference between the first and last time stamp with same IMSI.CallID pair is the total duration of that call.

FIG. 1 is a diagram showing an illustrative environment 100 in which classification of telecommunication event objects, including call emulation, may be performed. According to the present example, the environment includes a telecommunication network 104 that establishes communication sessions between devices 102. In the present example, the telecommunication network 104 is a Long Term Evolution (LTE) network, which may be used to provide VoLTE services. However, the principles described herein may be applied to other types of networks, such as 3G networks, 5G networks, cable networks, and the like.

In short, the telecommunication network 104 may include various capture devices 118a, 118b that collect information from network events, such as communication sessions or calls. That captured information is then provided to a collection module 120. The collection module 120 includes hardware and/or logic for taking the information captured by the capture devices 118a, 118b and putting it into a particular data structure. Such data structure may be referred to as an event object. The event objects created by the collection module 120 are then provided to the analytics module 122 for classification. The classified event objects are then provided to the inference module 124 to infer relationships between input parameters (e.g., device, region, protocol) and output parameters (KPIs).

An event object may include information from multiple protocols (for example, SIP, RTP, S11-MME etc.) that are involved in a VoLTE call. Because a specific attribute such as IMSI & CallID may not be present in every protocol associated with a particular call, the information from multiple protocols may be used to identify common attributes across two or more protocols. For example, voice call identifiers are present in SIP, and not present in RTP and S11-MME. Similarly, an IMSI identifier is present in S11-MME but not present in SIP, RTP etc. S11-MME includes user plane tunnel establishment procedures and user plane tunnel identifiers (which are also present in S1U user plane tunnels that carry SIP and RTP traffic), tunnels-ID may be used to correlate between S11-MME & S1U user planes that carry SIP and RTP protocol packets. Thus IMSI information in the event objects may be determined by correlating between S11-MME and S1U protocol data. Similarly CallID information may be populated in an event object by correlating SIP data with SDP and RTP protocols. The protocol flows for multiple protocols may be correlated pairwise by matching common attribute fields and temporal sequence of protocols such as, for example, S1-MME exchange preceded S1-U/SIP traffic and protocol insights.

In further detail, the telecommunication network 104 includes a radio access network 106 and a core network 110. The radio access network 106 includes the stations (in this case eNodeB's 108) that wirelessly connect to mobile devices, such as the user devices 102. Such wireless devices may be referred to as User Equipment (UEs). The user devices 102 may include any piece of hardware and/or software that is capable of interfacing with the telecommunication network 104. For example, a user device 102 may include a smart phone, a desktop computer, a laptop computer, a tablet computer, or other computing system. The user devices 102 may interface with the telecommunication network using a variety of telecommunication protocols. For example, the user devices 102 may communicate using SIP and Real-time Transfer Protocol (RTP). Other protocols are contemplated.

As mentioned above, while the telecommunication network 104 may be one of a variety of types of networks offering a number of applications and services, the present example is an LTE network that may provide Voice over Long Term Evolution (VoLTE) services. A VoLTE service establishes packet-switched connections between two user devices using the media bearer plane of the LTE standards.

Continuing this example, the telecommunication network 104 may include various pieces of infrastructure. For example, the telecommunication network 104 may also include a core network (Referred to as Evolved Packet Core (EPC)) that includes a Mobility Management Entity (MME) 112, a Service Gateway (S-GW) 114, a Packet Data Network (PDN) Gateway (PGW) 116, and an Operations Support System (OSS) and a Network Management System (NMS) 126. The core network 110 may provide connection to the Internet through the internet access module 130 and various IP multimedia (IMS) servers 128. In other examples where the telecommunication network is a VoIP network, the infrastructure may include a variety of internet servers.

The MME 112 is a control-node for the LTE access-network. It is responsible for idle mode UE (User Equipment) paging and tagging procedure including retransmissions. The MME 112 is involved in the bearer activation/deactivation process and is also responsible for choosing the SGW for a UE at the initial attach and at time of intra-LTE handover involving Core Network (CN) node relocation. It is responsible for authenticating the user (by interacting with the Home Subscriber Server (HSS)). The MME 112 checks the authorization of the UE to camp on the service provider's Public Land Mobile Network (PLMN) and enforces UE roaming restrictions. The MME 112 handles the security key management. Interception of signaling is also supported by the MME, such as the capturing performed by capture device 118a. For example, signaling traffic exchange with the MME may be mirrored by the MME or mirrored by a transit network device such as a router or tapped by optical tap, and fed to the capturing device 118a.

The SGW 114 routes and forwards user data packets, while also acting as the mobility anchor for the user plane during inter-eNodeB handovers and as the anchor for mobility between LTE and other 3GPP technologies. The SGW 114 manages and stores UE contexts, e.g. parameters of the IP bearer service, network internal routing information. It also performs replication of the user traffic for interception.

The PGW 116 provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception and packet screening. Another role of the PGW is to act as the anchor for mobility between 3GPP and non-3GPP technologies.

The capture devices 118 may include various probes, deep packet inspection devices, or other virtualized packet analysis functions that collect the data being transmitted to either the MME or the SGW. For instance, each capture device may collect and decode data packets and send digest of the data packets to the analytics platform 101. The digest of the data packets may include particular protocol events, associated network elements associated with the activity, call or flow identifiers, other application/protocol specific information elements (e.g. web site, location, etc), specific measurements (e.g. upstream/downstream packets, upstream/downstream bytes, inter-packet measurements, latency between certain procedures, etc), The capture devices 118 may include, for example, a Data Capture Engine (DCE) and a Network Data Processor (NDP). The DCE may capture the relevant data and the NDP may process that data. The NDP may then pass the data to the analytics platform 101, and more particularly, the collection module 120 of the analytics platform 101. In some examples, the collection module 120 instructs the capture devices 118a, 118b to collect specific types of data. For example, the collection module 120 may detect a negative event such as a dropped call, or a threshold number of dropped calls, and request that the capture device provide specific pieces of information or retain the information already captured and stored in it's internal memory, or export to NDP or analytics platform 101 for further analysis.

The data capture devices 118a, 118b (via optical TAP, port mirror, bump-in-the-wire, etc.), may have intermittent packet losses, due to network/memory/CPU load or due to race conditions in protocol processing. For example, if a tunnel deletion event from S11 is processed by the DCE before all the data corresponding to that tunnel, the tunnel may be marked as deleted and the remaining data of that tunnel may not be processed correctly. Because the DCE is acting on a copy of the packets, while the end-systems processes correctly, DCE interpretation may be inaccurate in some cases. These cases are accommodated by multi-protocol correlated view of a call, rather than depending on a specific protocol; for example, if 2000K response is missing for an INVITE transaction, but there is bidirectional RTP data for a time greater than a configured period, and bidirectional data is greater than configured value, the call could be considered as successful. Similarly, if INVITE transaction is missing, and 2000K (INVITE) is received the Analytic system per the current technique considers the call as successful.

In some examples, the capture devices only record data for a preset period of time in the past. For example, the capture devices 118a, 118b may collect event data for the past hour and store it in a First In First Out (FIFO) buffer. Thus, any new data coming in overwrites the oldest data. If the capture devices 118a, 118b receive a request from the collection module for certain data, then the data in the buffer may be sent to the collection module 120.

The collection module 120 includes the hardware and/or software to receive data from the capture devices and create a data structure that stores various pieces of information about a particular session (e.g., call). Such a data structure will be referred to as an event object 302 and will be discussed in further detail below with the text accompanying FIG. 2. The collection module 120 may include one or more computing systems such as servers.

The collection module 120 may also perform various operations on the data it receives to format it for classification and inference. For example, the collection module may perform a dimensional drill down to identify specific dimensions worth taking a closer look at. Specifically, the collection module 120 may identify the top dimensions for each class of failure or anomaly and suggest focus points for deeper analysis. It groups failures and protocol anomalies (such as interpacket gaps, packet drops, jitter etc.), as major categories and failure types and identifies dominant dimensions for drill-down. For example, the major categories may include repeat calls, dropped calls, one-way calls etc. Protocol KPI based characterization (based on protocol cause codes, observed packet behavior etc.) and failure type are identified. The failure types identified are suggestive of cause of failure, and include device cause, RAN-cause, core network cause, IMS-cause, and the like.

The collection module 120 may also reduce the data into smaller samples. More specifically, the collection module may reduce the data volumes (table rows) in a plurality of tables (for example SIP, RTP, S11, Sv etc., in 3GPP VoLTE deployments) by using the value of dimension attributes (for example, device type=Samsung Galaxy-8), from the alarm/error/warning/Information alerts together with the time-window of the event and reduce the data scope in multiple tables. The data reduction may significantly help service personnel to focus on much smaller datasets near anomaly peaks, in the segments where the anomalies occurred.

To reduce the amount of data, extraneous data for successful or non-problematic calls may be removed, while such data is kept for problematic calls. Specifically, for non-problematic calls that follow the normal setup sequence via SIP, and exchange data via RTP without voice/video quality problems, and successfully terminate using SIP BYE method, the only interesting attributes may be total duration and voice quality (Uplink/Downlink MOS scores). Thus, other data from such event objects may be removed. In some examples, if the MOS scores are computed in real-time on the collected RTP/RTCP parameters, MOS scores for the duration of the call may be sufficient for the analytic system for non-problematic calls. The remaining fine-grained data may be unimportant. However, for problematic calls, fine-grained data from SIP/RTP/RTCP/S11/SV protocols may facilitate root-cause analysis.

In a stable VoLTE network most calls are successful and corresponding protocol KPIs are good. Thus, for a large volume of call related events (e.g., 10 Million calls per day) only a small portion (e.g., less than 5%) of such events correspond to calls with bad quality (call drops, failures, media gaps etc.). Furthermore, a small percentage of the bad KPIs are due to a specific eNodeb, a specific device type, or user mobility, etc. However, the 95% of good KPI events dominate the amount of data and strongly bias any statistical algorithms. Filtering out 95% of such data with good KPIs may be inadequate because it may remove the conditions around the anomalies with which to compare data from bad KPIs. Thus, in some examples described herein, the collection module 120 may first select the events with anomalous KPIs, extracting the dimension value of those events (e.g., eNBs, device types, SGWs, APN, QCI etc.), and extract the events for those dimensions from the original large data volume.

For example, if registration failures are high, and the dimensions show, "device types A,B, and eNBs 30,32,40,50, APNs A1,A5," then extracting event data, only when "any of the dimension values match," reduces the amount of data to be analyzed. Feeding the filtered or reduced data to the analytics module 122 and inference module 124 estimates a Problem Diagnosis (PD) by assigning weights to the underlying dimensions. For example, the registration failures could be due to a new vendor device in a particular geographical region of an operator network. This process is repeated for each KPI and the associated anomaly type. The reduced dataset, when fed to the analytics module, facilitates focused visibility to service personnel for additional drill-down and cause analysis.

Additionally, data reduction may include a density-based reduction in which the protocol cause codes (SIP, Q.850, S11, S1-MME, Sv etc.) along with data observations (such as RTP/RTCP media data) such as packet loss, delay, jitter are used to roll-up to a summary Call-KPI (CPI), and the density (%) of each underlying protocol cause is determined, and the top density causes are determined and used to extract information corresponding to the highest density causes. The rules table 300, illustrated in FIG. 3, combines signaling events (SIP cause codes, reason codes, observations from RTP, SRVCC events from Sv interfaces, S11, S1-MME cause codes etc.) for characterizing dropped calls, and the proportion of each cause code to the dropped calls. In one example, it may be determined that 71.17% of dropped calls have inactivity time out after SIP INVITE method. Because the dropped calls are a small proportion of all calls, (for example <5%), filtering out "INVITE+inactivity-timeout", for dropped call analysis from the total dataset is a substantial reduction. The "failure category" in a rules table, as will be described in further detail below, may be determined from the UPLINK/DOWNLINK of the procedure, call-type (Mobile Terminated/Mobile Originated) and the type of cause; for example, for a mobile terminated call, inactivity timeout after SIP INVITE is sent to the mobile device could be due to radio coverage.

VoLTE/ViLTE services involve several underlying control plane and user plane protocols. For example, S1-MME control protocol may be used to establish User Plane Tunnels through data-plane (S1U). S11 protocol may be used between the MME 112 and SGW 114. SIP relates to the control plane that runs over the S1U user plane. The RTP data plane carries user data packets using S1U tunnels. Each of these protocol packets are received via the capture devices 118a, 118b (which may include, for example, an optical tap or mirror port) and processed in a compute server node which may be part of the collection module 120. The collection module 120 may also be referred to as a Data Capture Engine (DCE).

Each protocol uses bidirectional packets. For example, SIP traffic flows from the User Device (UE) to the IMS Server, and from the IMS server to the UE. The DCE maps both directions of a flow, for example a User Call, and creates transactional events, such as INVITE, REGISTER etc. Similarly, the collection module 120 maps each call to a User-IMSI (terminating or originating) based on correlating between user plane tunnel and the control plane (S1-MME or S11) that establishes the user plane tunnel. The events have associated status codes that identify Success, Failure Reasons, Progress indication (for example ringing etc.). When a call setup is successful, an RTP data path is established between caller and callee to exchange user data packets. Due to network conditions such as poor RF conditions, user data packets may get dropped, creating media gaps.

Using principles described herein, loosely characterized KPIs such as successful calls, failed calls, dropped calls, mute calls are characterized based on a plurality of protocol and data exchanges associated with such calls. Some of these KPIs are derived based on SIP alone, and other are based on RTP, S11, or other protocols in addition to SIP. According to principles described herein, information from multiple protocols such as SIP and RTP transactional procedural steps are used along with several other pieces of information such as underlying transport layer tunnel changes due to mobility for a call based on SIP call-ID, transport tunnel IDs on which the SIP traffic is carried, User IP Address & Port Numbers, and S11 etc.

The collection module 120 may also be able to identify VoLTE-To-VoLTE calls. This may be done by analyzing the SIP protocol packets in both directions (uplink and downlink directions on the S1U interface). Specifically, if both the originating and terminating user devices are in the VoLTE RAN, it may be determined that both are VoLTE. This may be achieved using the following steps: Convert From, To Field to a common format. The treatment is different for From & To; (a) Convert all character to same case; (b) Extract string after SIP: or SIP:+, TEL:, TEL:+ and before @ as "Address (Addr)". The string @xxx may or may not appear after Addr; (c) If Addr starts with a digit (0-9) and it's length=10 digits, and the 1st digit is not a zero, prepend with country code 91; With this all digit fields of addr become 12 digits. In the "TO" field any address such as "*41" etc., remain unchanged; (d) Any non-digit strings in the From/To fields will remain same along with "@xx" string. Only 10 digit fields that do not have '0' as the 1st digit will be prepended with 91; (e) If the "dir="Down", swap "From and To" field. The new fields are names as fr2 and to2; (f) FR2TO2=CONCAT(FR2,TO2) Fpr each FR2TO2 count UP & Down. For each FR2TO2, the minimum count gives the number of Volte_to_VOLTE Calls for that From/TO Pair.

This method gives only counts but does not identify which call is V-V or not. To identify each call as V-V or not: repeat steps (a)-(f); Sort in FR2TO2, Record Start Timestamp (tr_starts_ts); For each FR2TO2 compute Delta Time from Previous record (same Fr2TO2). If "dir" of previous & current records differ and the delta-time <300 Seconds, then the call is V-V.

The collection module 120 may also mark certain calls as conference calls, multi-party calls, or calls on hold. This may be done by correlating the plurality of control and user planes (QCI 5 and QCI1), SIP & RTP, S11 & S1-MME and further correlating the time boundaries of SIP & RTP sessions of a user. In VOLTE, the SIP and RTP sessions of a user may traverse on the same GTP-U Tunnels (Over the TOP VOIP), or unique dedicated bearers for improved QOS. For example, SIP uses QCI5 bearer and RTP uses QCI1 bearers. Multi-party calls are identified, by determining additional INVITEs while one call is active, and multiple sources are present in the RTP packets. In multi-party calls where there are more than two participants, data sources in RTP indicate multiple sources in overlapped time intervals. Multi-party calls are differentiated from hold calls by differentiating time overlapped calls with data from one source only in an interval, and SIP cause codes.

The analytics module 122 takes the event objects from the collection module 120 and classifies them based on the information contained within the event objects. This may be done, for example, through use of a rules table (e.g., 400, FIG. 4). More detail on the rules table 400 will be discussed in the text accompanying FIG. 4. In short, the rules table may include several entries, each entry having a combination of parameters corresponding to data points in the event objects. Each entry may also be associated with one or more KPIs. For example, various combinations of data points from an event object may be associated with a dropped call KPI or a failed registration KPI. A per-call data record may be compared against a classification mechanism, such as a rules table, to identify a particular reason for failure. Classification mechanisms other than the rules table may be used as well.

The inference module 124 takes the classified event objects and performs various functions to infer relationships from those event objects. For example, in addition to the data points used to classify the event objects, the event objects include several other data points such as type of devices used in the call, geographic location, and other data points that may be used as inputs. The inference module 124 may infer relationships between those inputs and the KPIs associated with those event objects. This may be done, for example, using a machine-learning function.

Figure 2:
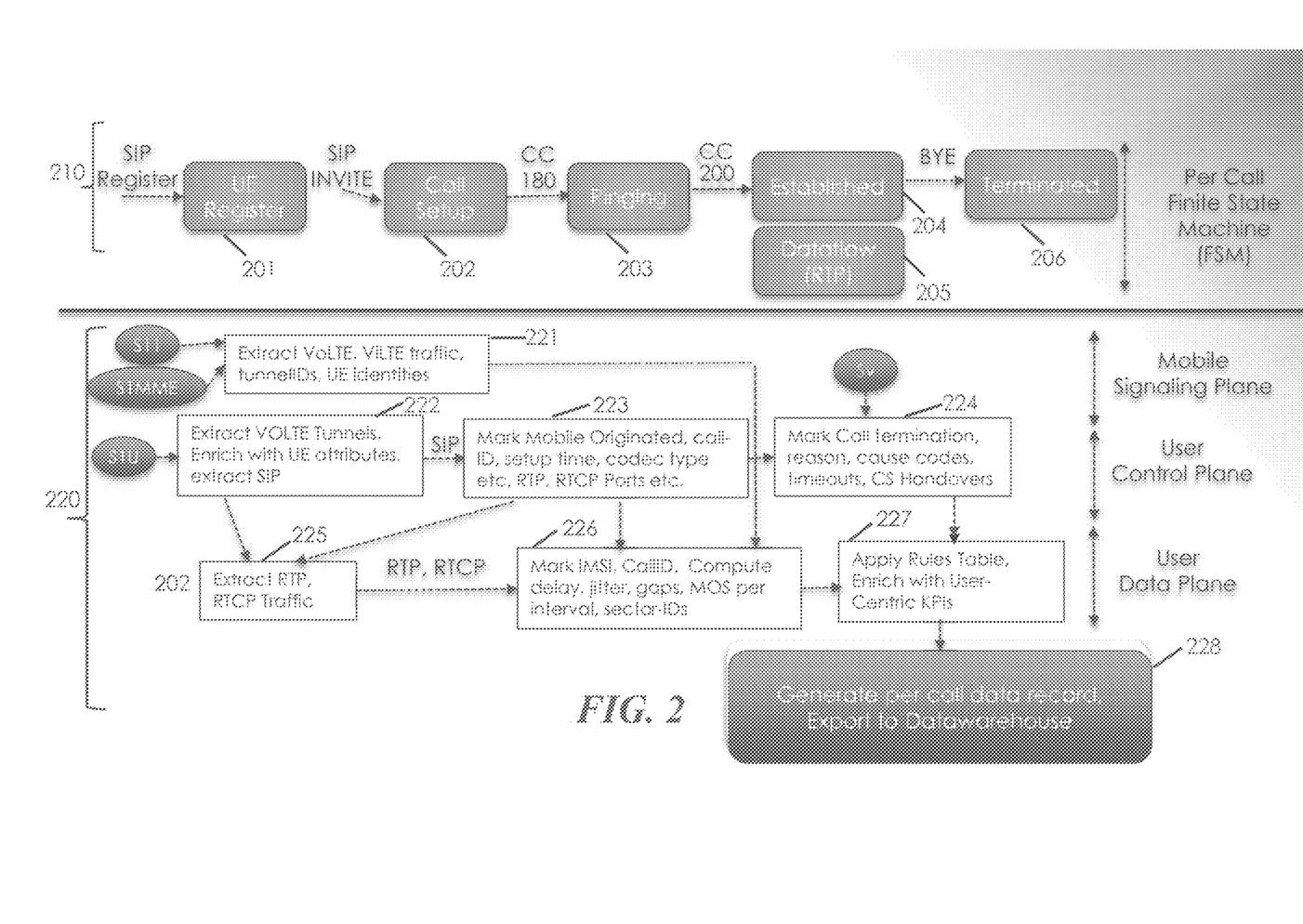
FIG. 2 is a diagram of a finite state machine and a flow chart of a method.

FIG. 2 includes a depiction of an example call state machine and a flow chart showing example call emulation, according to one embodiment. In this example, the state of the call is constructed using the copies of the received protocol attributes of plurality of protocols according to one embodiment. Item 210 is an illustration of an example finite state machine, including SIP and RTP over the duration of a call. It is understood that the scope of embodiments is not limited to SIP or RTP and that communication sessions using other protocols may be treated similarly and have their own state machines that can be used in this same manner. Item 220 is a flowchart illustrating tracking of call state and then using the call state to generate an event object and a call data record. Various embodiments use such methods from copies packets/protocol attributes, and constructs both sides of a protocol; additionally, since a voice/video call may involve multiple protocols, the finite state machines of multiple protocols are correlated as illustrated in FIG. 2.

Looking at the finite state machine 210 first, it includes state 201, which is SIP register, in which the end user's equipment (UE, such as a smart phone) registers with the network. State 202 includes a call set up phase, which in the context of SIP may include a INVITE message. State 203 includes ringing, and state 204 includes an established call, such as after the callee picks up. State 206 is when the call is terminated, such as may be triggered by a SIP BYE message. States 201-204 and 206 represent the set up and tear down of the call. State 205 is the data flow, such as when media data packets may be sent to and from the users (e.g., caller and callee). In one example, the data packets may be sent to and from the users according to RTP, though other protocols may be used in other embodiments.

State machine 210 indicates the different states that may be included within a successfully set up and terminated call. However, some calls may be unsuccessful and may fail at any of the states 201-206. Accordingly, various embodiments include a virtual call emulation that tracks the state of a call as the call is ongoing both for successfully set up and terminated calls as well as for calls that may experience problems. In one example, a call may fail at state 202, and the call emulation for that call may indicate failure at state 202 and that the call did not progress to the other states 203-206. The same is true for a call failure at any of the states 201-206. Similarly, a successful call may include a state machine emulation that indicates that each of the states 201-206 were successfully attained.

In an example in which a call has a problem at a particular state, that problem may be reflected in the call data record, which may indicate both the state and the problem.

Moving to flowchart 220, it is noted that it references various protocols including S11, S1MME, S1U, and Sv. The scope of embodiments is not limited to those protocols and in fact may apply to any telecommunications protocol. The actions of flowchart 220 are performed by collection module 120 of analytics platform 101 in this example.

At action 221, the analytics platform 101 extracts VoLTE and ViLTE traffic, tunnel IDs, and UE identities from the S11 and S1MME. That extracted information is used again at action 226 (discussed in more detail below). At action 222, the analytics platform 101 also extracts VoLTE tunnels and SIP from S1U and then enriches that information with UE attributes. At action 223, the analytics platform 101 marks mobile-originated calls as mobile-originated calls and also saves call-ID, set up time, codec type, RTP, RTCP ports, and the like. At action 224, the analytics platform 101 saves the call termination, reason, any applicable cause codes, timeouts, and any handovers.

At action 225, the analytics platform 101 extracts RTP and RTCP traffic. At action 226, the analytics platform 101 also saves IMSI, call-ID, computer delay, jitter, gaps, MOS per-interval, and sector-IDs.

The information gathered and saved at actions 221-226 include data such as UE identities, VoLTE tunnels, call-ID, ports, and IMSI information, all of which can be used to identify a particular call through its various stages and over different protocols. The analytics platform 101 correlates these different pieces of information, as described above, and saves the information with an indication at which state of the finite state machine it occurs. Therefore, by the end of action 226, the analytics platform 101 has the information within flow 220 correlated to the particular stages of the finite state machine and saved appropriately. Furthermore, the analytics platform 101 may save this information to one or more event objects, such as depicted in FIG. 3.

At action 227, that information can then be applied to a rules table (as in FIGS. 3 and 4), which is described in more detail below. The information is then used to generate a protocol data record and exported to a data warehouse at action 228.

Figure 3:
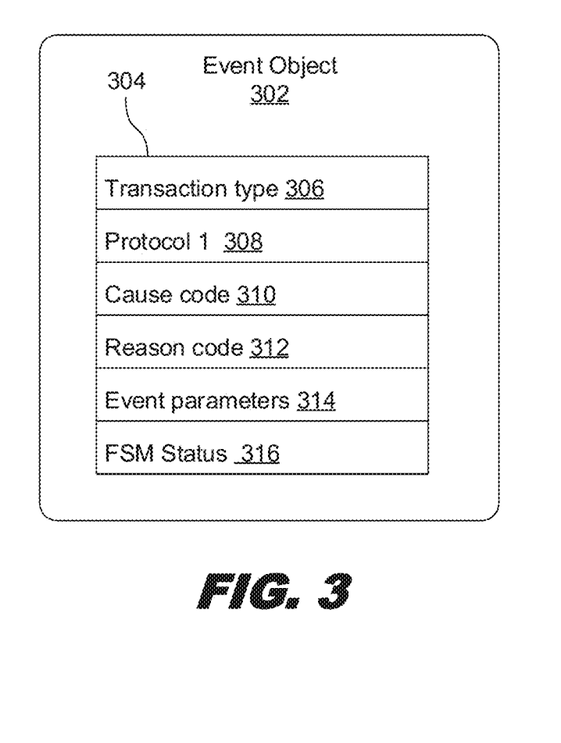
FIG. 3 is a diagram showing an illustrative event object that may be classified, according to principles described herein.

FIG. 3 is a diagram showing an example event object 302 that may be classified into a particular KPI based on information 304 contained therein. In the present example, the event object includes a transaction type field 306, a protocol field 308, a cause code field 312, a reason code field 314, an event subcategory field 316, and event parameters field 318. A given call may include multiple transactions, so an event object, such as event object 302, may include information for a multitude of transactions.

The transaction type field 306 indicates the type of transaction associated with the event. For example, the transaction type may be a register transaction. This may be, for example, a SIP register request. A register request is used by a device to let a server know where it is (i.e., it's destination address). The transaction type may also be a deregister transaction. The transaction type may also be an invite request. An invite request sends a message to a server requesting to set up a communication session. The transaction type may be a bye request, which is used to end a communication session. Other transaction types may include reinvite, an Sv_REQ_RESP transaction, an Sv_COMP_NTFY transaction, and an Sv_CNCL_NTFY transaction.

A given call is typically expected to include multiple transactions from the beginning of the call, through the data transfer, and to the end of the call.

The protocol 308 field indicates the type of communication protocol associated with a particular event. Various protocols may include, SIP, RTP, Q.850 and others. Such protocols include various operations to establish calls or transmit data between endpoints. Such protocols also use cause codes and reason codes to indicate the success or failure of certain actions. In fact, many protocols have their own sets of cause codes. Furthermore, and as mentioned above, a given call may include transactions from multiple protocols, so an event object may represent data from multiple protocols and multiple transactions, including respective cause codes, parameters, and reason codes.

The cause code field 310 lists a cause code associated with the event object 302. For example, the cause code may be 300, indicating success; a cause code may be 400, indicating a failure; a cause code may include 486, indicating that the callee is busy (all three example being SIP cause codes). There are a variety of other cause codes to indicate various outcomes. The reason code field 312 may include more specific information about the reason why a particular cause code was provided. For example, there may be several reasons why a cause code 486 is provided. The reason code may give more specific information as to why the callee is busy. Many protocols have their own sets of reason codes.

The event parameters field 314 may indicate a variety of information associated with the event. For example, the event parameters field 314 may indicate the types of device or devices indicated in the event. For example, if the event relates to a call between two mobile devices, then the event parameters field may include information identifying both caller and callee devices. In some cases, only the callee device may be provided. The event parameters may include other types of information such as geographical location, specific eNodeBs involved in the event, specific routers, specific servers, etc.

The FSM status 316 includes a status of the finite state machine 310. A given transaction may be associated with a particular state of the state machine, and the event object 302 records that state along with the other information in the other fields.

Figure 4:
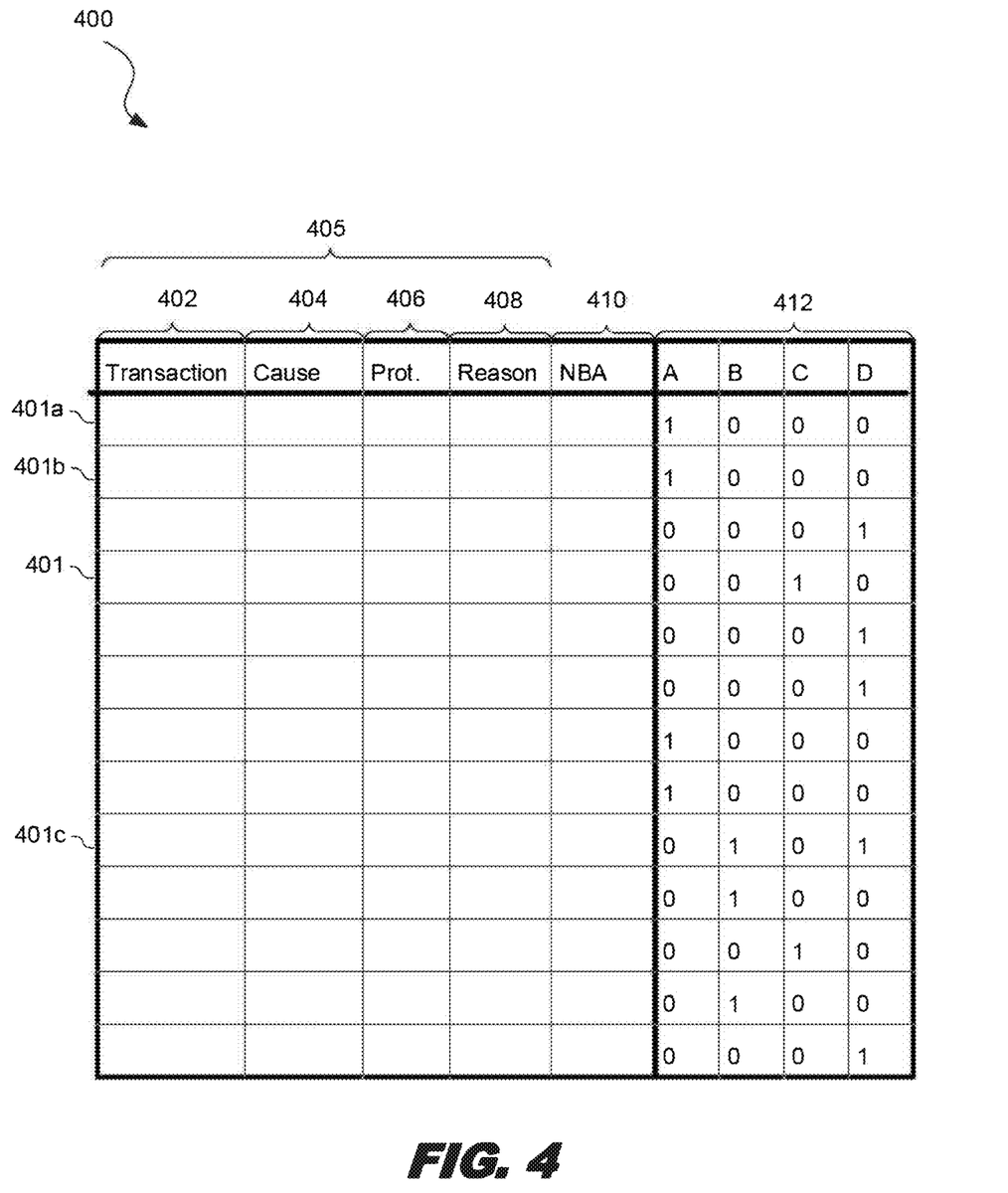
FIG. 4 is a diagram showing an illustrative rules table that may be used to classify event objects, according to one example of principles described herein.

FIG. 4 is a diagram showing an illustrative rules table 400 that may be used to classify event objects (e.g., 402, FIG. 2). According to the present example, the rules table 400 includes a number of columns. Specifically, the rules table includes a set of event columns 405, a subcategory column 410, and a set of KPI columns 412. The event columns 405 include a transaction column 402, a cause code column 404, a protocol column 406, and a reason code column 408.

The rules table 400 also includes several entries 401. Each entry 401, includes various combinations of information from the event columns. For example, there may be several entries that list an "invite" in the transaction field. For each of the entries that have an "invite" in the transaction field, there may be several entries with a particular cause code. For each entry with a particular transaction and cause code, there may be entries with various protocol types and reason codes.

For each entry, there are a number of KPI columns. Each KPI column 412 (e.g., A, B, C, or D) may correspond to a different KPI. As mentioned above, KPIs may include successful call attempt, failed call attempt, dropped call, media failure, successful registration, failed registration, inter-working success, and inter-working failure. In some examples, for each entry 401, there may be a "1" in one of the KPI columns indicating that the combination of information from the event columns 405 of that entry correspond to that particular one of the KPI columns. The rest of the columns in that entry 401 may include the value "0." In some examples, a particular entry may identify with more than one KPI and thus there may be multiple '1's in the KPI columns for a given entry. In some examples, instead of having a number of KPI columns with ones and zeros, there may be a single KPI column in which a particular KPI is listed. A more detailed example of a rules table may be found in the provisional application to which this application claims priority, such provisional application being incorporated herein by reference.

As a more specific example, both entries 401a and 401b include a "1" in column A. Thus, in the example, where A represents a failed registration, the rules table provides two different situations in which the KPI is a failed registration. Additionally, entry 401c includes a 1 in both the B column and the D column. Thus, some entries may be associated with more than one KPI.

Using the rules table 400, the analytics module (e.g., 122, FIG. 1) may classify event objects received from the collection module (e.g., 120, FIG. 1). For example, a received event object may indicate a register transaction using SIP with a particular cause code and reason code. The analytics module may find an entry 401 with those parameters and classify the event object based on the KPIs corresponding to that entry. For example, the analytics module may determine which columns of the matching entry have a "1" in the KPI columns 412. The classified event object may then be passed to the inference module (e.g., 124, FIG. 1).

Each KPI classification may use subset of the protocol attributes but not others; for example Failed Call Attempts, Successful Call Attempts may use SIP protocol transactional information and not RTP. The event table that contains records for multiple protocols may be first filtered removing unneeded protocols thus reducing the data volume to be processed by machine learning algorithms, rules table processing or the like. For some KPIs such as established calls, the unique calls based on concatenation of CallID with IMSI is determined first, and the UniqueCallIds are used to filter the event data for other KPIs such as Oneway Calls, Media Gaps etc., thus forming a deep learning chain in classification.

Each transaction may include a request and one or more response events. For example, a user CALL attempt using an INVITE Transaction, may be completed with 2000K response or provisional response indicating progress, as well as a 2000K Response. Each response has one or more cause attributes, for example status codes per SIP Protocol (RFC 3261) and reason header from ISUP (Q.850). The status and reason fields broadly differentiate success codes (1XX), client failures (4XX), server failures (5XX) etc., at the SIP transaction level. These SIP codes do not classify underlying subsystems, and also do not classify behavior of user data (RTP) such as one-way data, media gaps etc. The rules table of FIG. 3 associates a plurality of protocol flows with a VOLTE/VILTE call, characterizes the failure or quality of the call, and identifies the possible subsystems for next level of troubleshooting for root cause.

Summarized information from RTP data records that include, downlink bytes, uplink bytes, interpacket gaps, jitter, delay, UP Link timeouts, Downlink Timeouts etc., are combined with SIP call records as "DATA" events by correlation using IMSI, User IP Addresses, SGW, ENB IP Addresses, TCP/UDP Port Numbers, event Timestamps etc. Similarly, event data from other protocol events, such as S11 tunnel creation/deletion events, Sv (SRVCC) VOLTE to CS Handover are correlated using common attributes such as IMSI, MSISDN, From/To Identifiers, event time stamp etc. The cause code for the event, and its effect on the VOLTE call (SIP or RTP) flows of user calls is identified. For example, a tunnel deletion event due to "Inactivity" or "Radio Connection with UE Lost," could cause a timeout in an RTP or SIP transaction. Based on event timestamps of SIP and RTP, the call duration may be computed. For example, the difference between timestamps of BYE and INVITE with the same callID, or the difference between the 1st and last time stamp with the same IMSI.CallID may indicate the total duration of that call.

Uplink/downlink data volume for the same user (IMSI) by other applications (other Radio Access Bearers) may also be captured. This helps in identifying Multi-Application (e.g., VOLTE and NON-VOLTE applications in an overlapped time) calls and increases the confidence level for "failure category". For example, when a mobile user is in a bad coverage area, uplink/downlink volumes in the UL tunnels for both VOLTE and NON-VOLTE may be low and helps identify the failure category as "RADIO Reason."

Priorities are assigned considering the protocol, protocol status code and the reason protocol along with the reason code. The failure cases are assigned with sub categories based on the underlying status/reason codes and possible subsystems that the status or reason codes correspond to. Based on correlation IDs within event data, and event time stamps, all the protocol events corresponding to a user and call are grouped to determine the "subcategory" column 410 in the rules table 400.

The subcategory column 410 may further categorize events by more than just a generic KPI. For example, the subcategory column 410 may include labels such as Device issue, IMS core issue, server busy/packet loss, IMS core provisioning, IMS core routing, breakout call failure. If, for a particular entry, a particular combination of information from the event columns 405 does not correspond to a particular subcategory label, then the field in the subcategory for that entry may be denoted as "other."

In some examples, a rules table 400 may include a next best action column 410. The next best action field for each entry may include an indication of an ideal solution for further investigation. If no ideal solution specific to the problem exists for a particular entry, the next best action column of that entry may be denoted as "other."

Figure 5:
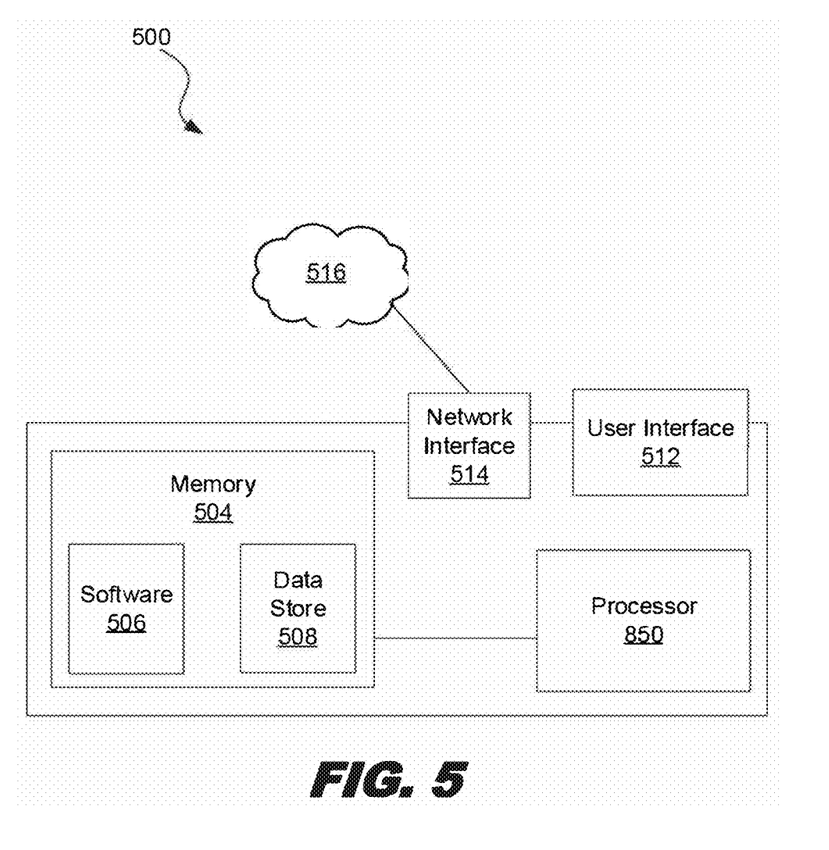
FIG. 5 is a diagram showing an illustrative computing system that may be used to perform the functions related to event object classification described herein.

FIG. 5 is a diagram showing an illustrative computing system that may be used to perform the functions related to call emulation described herein, such as the functions described above in the text accompanying FIGS. 1-4 and 6. In other words, the computing system 500 may be used to perform the functions associated with the analytics platform 101. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. The software 506 may be, for example, software designed to provide a web communication feature creation service. In such case, the computing system 500 may be associated with the web communication service. In some examples, the computing system 500 may be associated with a user. In such case, the software 506 may be an application to render web content, such as a browser. The software 506 may include machine readable instructions of a computer program product that when executed, perform the functions described above in accordance with the text accompanying FIG. 4.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Figure 6:
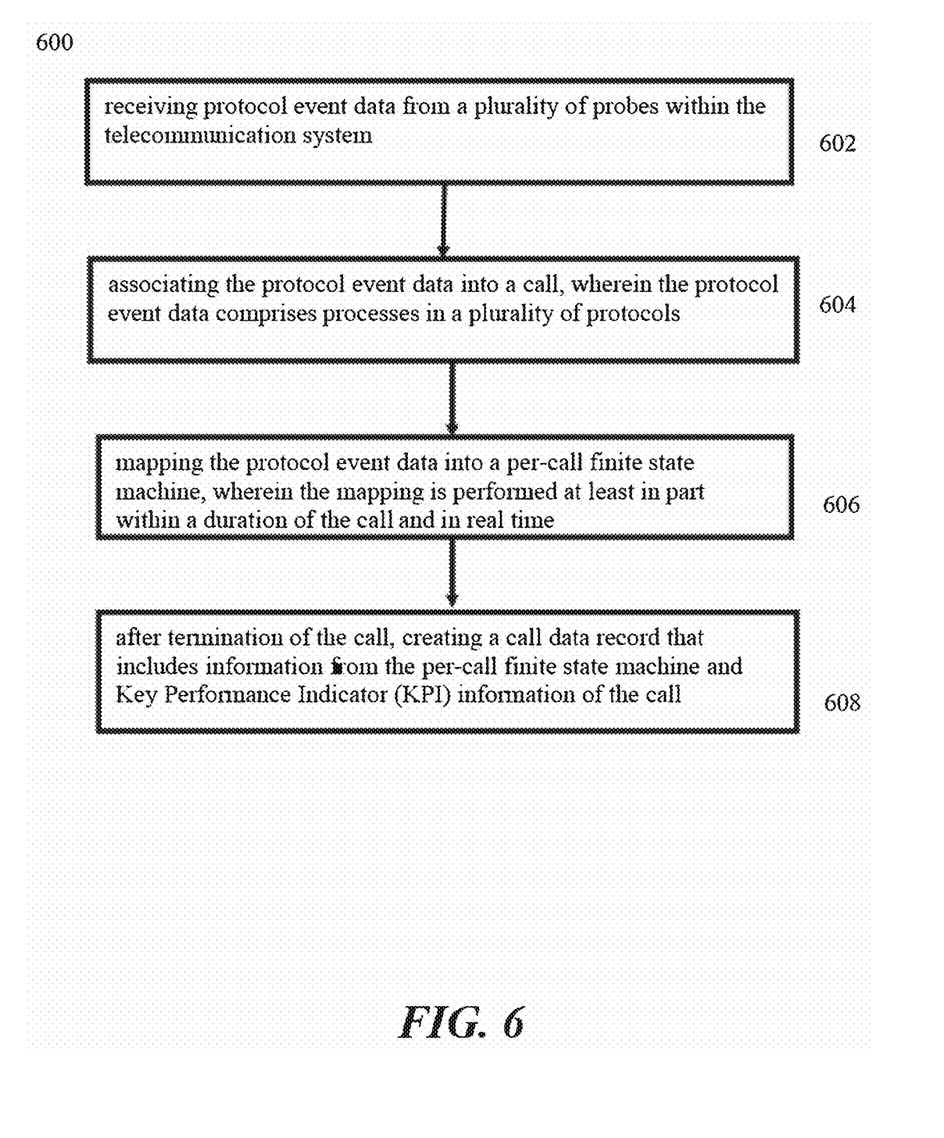
FIG. 6 is a flowchart showing an illustrative method for emulating a call, according to one example of principles described herein.

FIG. 6 is a flow chart illustrating an example method 600 for emulating a communication session, according to one embodiment. Method 600 may be performed, e.g., by a collection module 120 of analytics platform 101 of FIG. 1. Put another way, one or more computers implementing analytics platform 101 execute computer-readable code that causes them to perform the actions of method 600.

At action 602, the system receives protocol event data from a plurality of probes within a telecommunication system. For instance, the probes may replicate data packets and send those data packets to analytics platform 101. The analytics platform may then parse the received information to understand the packet at each protocol layer. In some examples, the probes may collect data that is being transmitted between a RAN and MME or between a RAN and a SGW. However, probes may be placed anywhere within the telecommunication system, even within a UE, an eNodeB, or elsewhere.

At action 604, the system associates the protocol event data into a call. In this example, the protocol event data comprises processes in a plurality of protocols. Examples of some protocols may include SIP, RTP, S11, Sv, S1MME, and the like. Associating the protocol event data into a call may include correlating common attributes among the different protocol processes. For instance, IMSI, MSISDN, from/to identifiers, event timestamps, and the like may be used to identify different protocol events as belonging to a single call. Furthermore, common attributes may also be used to exclude some protocol events belonging to other calls. In short, the system may use these common attributes as well as correlating uplink and downlink flows with corresponding tunnel ids, and any other appropriate techniques, to identify that a subset of protocol processes belong to a single call.

In this example, an event object contains information from multiple protocols (for example, SIP, RTP, S11-MME etc.), for a VoLTE Call (Voice over LTE call). Since a specific attribute such as international mobile subscriber identity (IMSI) and CallID may not be present in every protocol involved in that call, various embodiments identify common attributes across two or more protocols. For example, Voice Call identifier is present in SIP Protocol, and not present in RTP, S11-MME Protocols. Similarly, IMSI identifier is present in S11-MME but not present in SIP, RTP etc. Since S11-MME protocol contains user plane tunnel establishment procedure, and contains user plane tunnel identifiers, that are also present in S1U User Plane Tunnels that carry SIP, RTP traffic, tunnel-ID are used to correlate between S11-MME & S1U User Plane that carries SIP and RTP protocol packets. Thus, IMSI in the event object that call attributes is determined by correlating between S11-MME and S1U protocol data. Similarly, CallID is populated by correlating SIP data with SDP and RTP protocols. The protocol flows of multiple protocols may be correlated pairwise by matching common attribute fields, temporal sequence of protocols, for example S1-MME exchange preceded S1-U/SIP traffic, and protocol insights.

At action 606, the system maps the protocol event data into a per-call finite state machine. In this example, the finite state machine represents possible call states in multiple protocols between call set up and termination and may even represent states not within a call, such as UE registration. An example finite state machine for a call is given at FIG. 2. As the call progresses, the system links the protocol events to particular states in the state machine. Furthermore, action 606 may be performed at least in part within the duration of a call. In other words, action 606 (as well as 602 and 604) may be performed in real-time or near real-time and completely or partly within the duration of the call.

As the event records are reported from the data capture devices that capture different protocols, constructing a finite state machine for that protocol for that portion of the call (or Tunnels that later are used for a call), and emulating a call facilitates classifying the call performance (KPI) for the specific phase of the call close to the time of the call. In other words, this may provide near-real time assessment in a streaming fashion so that the assessment may be completed by the time call is completed. Such feature may reduce the amount volume of information to be retained for longer time intervals. This feature may also provide initiating corrective actions early, as the anomalies increase in a cell, sector or other aggregation points.

Action 608 takes place after termination of the call. Action 608 includes creating a call data record that includes information from the per call finite state machine as well as KPI information for the call. For instance, action 608 may include comparing a protocol cause code to one or more entries in a rules table to identify a failure in the call. Action 608 may also include saving an indication of the failure in the call data record.

The scope of embodiments is not limited to the action shown in FIG. 6. Rather, various embodiments may add, omit, rearrange, or modify various actions. As an example, it is expected that in a real-world use case, that multiple telecommunications calls would occur simultaneously in the system and that method 600 would be performed for each of those different calls during the duration of those calls, so that method 600 is performed in parallel for each of those calls and is repeated for new calls that occur.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a computing system that collects information in a telecommunication system, the method comprising:
   receiving protocol event data from a plurality of probes within the telecommunication system, including copying packets received at the plurality of probes, and analyzing packet copies to access the protocol event data;
   associating the protocol event data into a call, wherein the protocol event data comprises processes in a plurality of protocols;
   mapping the protocol event data into a per-call finite state machine, wherein the finite state machine represents possible call states between call setup and termination and includes a state representing a protocol exchange, wherein the mapping is performed at least in part within a duration of the call; and
   after termination of the call, creating a call data record that includes information from the per-call finite state machine and Key Performance Indicator (KPI) information of the call.

2. The method of claim 1, wherein the KPI information includes an item selected from the list consisting of: successful call attempt, failed call attempt, dropped call, media failure, successful registration, failed registration, inter-working success, and inter-working failure.

3. The method of claim 1, wherein the plurality of protocols includes multiple items selected from the list consisting of: Session Initiation Protocol (SIP), Real-time Transfer Protocol (RTP), S11, and S1MME.

4. The method of claim 1, wherein the finite state machine includes multiple items selected from the list consisting of UE registration, call set up, call established, data flow, and call termination, user plane tunnel establishment, and user plane tunnel deletion.

5. The method of claim 1, wherein the probes collect data being transmitted between a Radio Access Network (RAN) and a Mobility Management Element (MME).

6. The method of claim 1, wherein the probes collect data being transmitted between a Radio Access Network (RAN) and a Serving Gateway (SGW).

7. The method of claim 1, wherein the mapping is performed in real-time as the protocol event data is streamed from the probes.

8. The method of claim 1, wherein associating the protocol event data into a call comprises: correlating uplink and downlink flows of a Long Term Evolution (LTE) session with a tunnel-id.

9. The method of claim 1, wherein associating the protocol event data into a call comprises: identifying multiple protocol events using a common International Mobile Subscriber Identity (IMSI) or CallID attribute.

10. A system comprising:
a processor; and
a memory having machine readable instructions that when executed by the processor, cause the system to:
receive protocol event data from a plurality of probes within a telecommunication system, including copying packets received at the plurality of probes, and analyzing packet copies to access the protocol event data;
associate the protocol event data into a call, wherein the protocol event data comprises processes in a plurality of protocols;
map the protocol event data into a per-call finite state machine, wherein the finite state machine represents possible call states between call setup and termination and includes a state representing a protocol exchange, wherein the mapping is performed at least in part within a duration of the call; and
after termination of the call, create a call data record that includes information from the per-call finite state machine and Key Performance Indicator (KPI) information of the call.

11. The system of claim 10, wherein the KPI information includes an item selected from the list consisting of: successful call attempt, failed call attempt, dropped call, media failure, successful registration, failed registration, inter-working success, and inter-working failure.

12. The system of claim 10, wherein the mapping is performed in real-time as the protocol event data is streamed from the probes.

13. The system of claim 10, wherein the finite state machine includes multiple items selected from the list consisting of UE registration, call set up, call established, data flow, and call termination, user plane tunnel establishment, and user plane tunnel deletion.

14. The system of claim 10, wherein the protocol event data includes data transmitted between a Radio Access Network (RAN) and a Mobility Management Element (MME).

15. The system of claim 10, wherein the protocol event data includes data transmitted between a Radio Access Network (RAN) and a Serving Gateway (SGW).

16. The system of claim 10, wherein associating the protocol event data into a call comprises: correlating uplink and downlink flows of a Long Term Evolution (LTE) session with a tunnel-id.

17. The system of claim 10, wherein associating the protocol event data into a call comprises: identifying multiple protocol events using a common International Mobile Subscriber Identity (IMSI) or CallID attribute.

18. A non-transitory machine readable medium having stored thereon instructions for performing a method comprising machine executable code which when executed by at least one machine, causes the machine to:
receive protocol event data from a plurality of probes within a telecommunication system, including copying packets received at the plurality of probes, and analyzing packet copies to access the protocol event data;
associate the protocol event data into a call, wherein the protocol event data comprises processes in a plurality of protocols;
map the protocol event data into a per-call finite state machine, wherein the finite state machine represents possible call states between call setup and termination and includes a state representing a protocol exchange, wherein the mapping is performed at least in part within a duration of the call; and
after termination of the call, create a call data record that includes information from the per-call finite state machine and Key Performance Indicator (KPI) information of the call.

19. The machine readable medium of claim 18, wherein the plurality of protocols includes multiple items selected from the list consisting of: Session Initiation Protocol (SIP), Real-time Transfer Protocol (RTP), S11, and S1MME.

20. The machine readable medium of claim 18, wherein the mapping is performed in real-time as the protocol event data is streamed from the probes.

* * * * *